United States Patent [19]
Walker et al.

[11] Patent Number: 4,986,619
[45] Date of Patent: Jan. 22, 1991

[54] HOLOGRAPHIC COLOR CONTROL SYSTEMS

[75] Inventors: Julie L. Walker, Waitsfield, Vt.; Stephen A. Benton, Lincoln, Mass.

[73] Assignee: Massachusetts Institute of Technology, Cambridge, Mass.

[21] Appl. No.: 429,203

[22] Filed: Oct. 30, 1989

[51] Int. Cl.$^5$ .............................................. G03H 1/28
[52] U.S. Cl. .................................. 350/3.61; 350/3.75; 350/3.77; 430/1; 430/2
[58] Field of Search ..................... 350/3.6, 3.61, 3.75, 350/3.77, 320; 430/1, 2

[56] References Cited

U.S. PATENT DOCUMENTS 4,498,740 2/1985 Caulfield .............................. 350/3.6
4,834,476 5/1989 Benton .................................. 350/3.7

OTHER PUBLICATIONS

Hariharan, "Pseudocolour Images with Volume Reflection Holograms," Optics Communications, vol. 35, No. 1, Oct. 1980, pp. 42-44.
Johnson et al., "Holographic Reciprocity Law Failure," Applied Optics, vol. 23, No. 2, Jan. 15, 1984, pp. 218-227.
Benton, Proceeding of the Third International Symposium on Display Holography, 1988.
Walker, "In Situ Color Control for Reflection Holography," Thesis, Feb. 1987, Massachusetts Institute of Technology, pp. 1-65.

Primary Examiner—Bruce Y. Arnold
Assistant Examiner—Martin Lerner
Attorney, Agent, or Firm—Thomas J. Engellenner

[57] ABSTRACT

Holographic color control systems are disclosed for the production of pseudocolor holograms by in-situ sequential swelling of an emulsion and exposure to three color separation images with a single wavelength reference light source. The resulting holograms yield images in three color primaries with excellent color registration and mixing, producing a full gamut of mixed colors, pastels and neutrals with three-dimensional perspective.

17 Claims, 3 Drawing Sheets

HOLOGRAPHIC COLOR CONTROL SYSTEMS

BACKGROUND OF THE INVENTION

The technical field of this invention is holography and, in particular, methods and apparatus for controlling the thickness of a holographic recording emulsion during exposure to obtain multi-color image reconstructions.

A hologram is a recording of an interference pattern generated by two overlapping beams of coherent light, one directly from a light source and the other reflected from an object. The recording medium is typically an emulsion formed by a gelatin binder loaded with silver halide microcrystals. When the hologram is displayed by reflection of an illumination beam off the recording medium (or, in the case of transmission-mode holograms, by the transmission of illuminating light through the recording medium), the result is a striking, three-dimensional view of the object.

Considerable efforts have been made during the past twenty years to develop color holograms, particularly reflection-mode color holograms. (Transmission holograms present special problems for the artisan in that the passage of illuminating light through a transmission hologram inherently results in a degree of color smearing, and this problem is greatly compounded when multiple recordings of different colored interference patterns are made.)

In the conventional approach to multi-color reflection holography, beams of coherent light in each of the primary (additive) colors—red, blue and green—are used to record distinct holograms in the photographic plate. In practice registration of the three images is very difficult, particularly for large plates, insofar as the focus and/or magnification of each beam is dependent on its wavelength; good registration requires careful angular adjustment of the beams. The need for additional reference light sources (e.g., a blue light laser and a green light laser, as well as a red light laser) also add a substantial cost to the system. Moreover, the recording medium, e.g., the photographic emulsion, typically has a different sensitivity to different wavelengths, dictating careful control of the exposure time and intensity of each beam as well.

An alternative approach to color holography lies in the use of a single light source and the deliberate variation of the thickness of the emulsion between two or more exposures in order to obtain reconstruction wavelengths that are different from that of the reference light source. These so-called "pseudocolor" reconstructions make multi-color imaging possible with only one color of reference light and thereby permit a single, less expensive laser (e.g., helium-neon or krypton laser generating coherent red light) to be used for recording.

Pseudocolor holographic techniques are disclosed, for example, by Hariharan, Vol 35, *Optical Communications,* pp. 42–44 (1980). In Hariharan's system, a two-color reflection hologram is obtained by first exposing an emulsion in its normal condition with red light. The emulsion is then soaked in a 3% solution of triethanolamine (TEA) which causes the emulsion to swell. A second exposure is made on the swollen emulsion with the same laser. When the emulsion is subsequently displayed, two distinct reconstructions can be viewed, one at a longer wavelength as a result of the first exposure and the other at a shorter wavelength due to the second exposure. Others have extended this technique using a TEA solution to obtain three-color reflection holograms.

The use of pseudocolor methods has been proposed by the present inventors as a way of rendering three-dimensional computer-generated designs, where computer manipulation of the images and careful design of a holographic optics allow precise registration of the component color images. For further discussion of the application of pseudocolor holography to computer image rendering, see, J. L. Walker, Master Science Thesis, Massachusetts Institute of Technology (February 1987); and S. A. Benton, "The Principles of Reflection Holographic Stereograms," in T. H. Jeong, Ed., *Proceedings of the Third International Symposium on Display Holography* (1988) herein incorporated by reference.

Nonetheless, current processes for the preparation of pseudocolor holograms continue to suffer serious shortcomings. The use of TEA solutions typically requires manual treatment of the emulsion to insure volumetric loading, and the emulsion surface must then be wiped clean or spun dry to avoid non-uniform swelling. Handling of the plate or film can lead to fogging of the emulsion, and, in any event, removal and replacement of the emulsion in exactly the same position to obtain proper color registration can be problematic.

Moreover, the use of TEA to expand the recording medium can also affect the photographic properties of the emulsion itself insofar as TEA is a sensitizing agent as well as a swelling agent. Thus, TEA tends to degrade previously recorded latent images and enhances the effects of subsequent exposures. To counteract the phenomenon, the exposure time and/or intensity of the exposing light in subsequent recordings must be carefully controlled.

Various alternatives to macromolecular bulk loading of the emulsion with TEA have been proposed. One particularly attractive alternative is the use of water as the primary swelling agent, for example, by immersion of the emulsion in a water/alcohol solution. By varying the water content of the solution, the degree of swelling can be controlled to an extent.

Unfortunately, water-based swelling techniques also have limitations in that gelatin-based emulsions exhibit swelling anomalies when water is introduced into the polymeric matrix. The gels that are most commonly used in emulsions tend to either not swell at all or swell to maximum expansion quickly in the presence of water. This "all or nothing" phenomenon makes it difficult in some instances to achieve an intermediate volumetric state for recording interference patterns that will exhibit a green primary color upon reconstruction.

There exists a need for better holographic color control systems, particularly for recording pseudocolor holograms. A system that could replace conventional bulk loading of an emulsion with a large molecular weight filler, such as TEA, and yet achieve emulsion thickness control without swelling anomalies would satisfy a long-felt need in the art.

SUMMARY OF THE INVENTION

Holographic color control systems are disclosed for the production of pseudocolor holograms by in-situ sequential swelling of an emulsion and exposure to three color separation images with a single wavelength reference light source. The resulting holograms yield images in three color primaries with excellent color registration and mixing, producing a full gamut of mixed colors, pastels and neutrals with three-dimensional perspective.

In one aspect of the invention, an enzymatic pretreatment method is disclosed to reduce crosslinkage of the polymeric recording emulsion, and thereby reduce swelling anomalies upon exposure to a swelling solution, such that the recording medium can be exposed to a plurality of color separation images while the volume of the emulsion is varied by swelling to form a set of superimposed holographic images having different reconstruction wavelengths. The enzymatic pretreatment process will typically employ a proteolytic enzyme, such as trypsin, collagenaese, maxatase, papain, or mixtures thereof. This enzymatic pretreatment solution will typically vary in concentration from about 0.001 percent to about 0.00005 percent by weight of the enzymatic agent. One particularly preferred enzyme is trypsin.

In one method of holographic color control, a holographic emulsion is treated with an enzymatic agent to induce the cleavage of bonds in the emulsion and then allowed to dry to normal thickness. Next, the emulsion is contacted with a first swelling solution to produce an increase in the thickness of the emulsion and exposed to a first color-separated image to create a recording capable of producing a first reconstruction image. The holographic emulsion then is exposed to a second swelling solution to produce a variation in the thickness of the emulsion and again exposed, this time with a second color-separate image, to create a recording capable of producing a second reconstruction image. To obtain the third primary color, the emulsion is once more contacted with a swelling solution that produces a further variation in the thickness of the emulsion and then exposed to the third color separated image. The resulting holograms yield images in three color primaries with excellent color registration and mixing.

In another aspect of the invention, holographic printers are disclosed for the preparation of reflection-mode pseudocolor holograms, including means for pretreating the emulsion to reduce swelling anomalies. Holographic printers of the present invention further include an emulsion control system which provides for in-situ sequential swelling of the emulsion and multiple exposures to color-separated images without the need for manual handling. In one illustrated embodiment, the emulsion control system includes a transparent housing, a swelling solution reservoir for bathing the emulsion, a swelling solution inlet and a drainage outlet so that various swelling solutions can be added and removed rapidly without the need for repositioning of the emulsion between exposures.

As used herein, the term emulsion is intended to encompass holographic recording media, generally, comprising polymeric gels which are loaded with light-sensitive materials, such as silver halide microcrystals. The emulsion may further include a glass or flexible film substrate, an adhesive layer to bond the polymeric gel to the substrate, as well as an anti-abrasive overfilm, as generally known in the art. In one conventional embodiment, the emulsion is formed by a gelatin (a collagen polymer) with traces of sulfur and gold, filled with about 17 percent by volume of silver bromide microcrystals, having an average diameter of about 0.035 microns. The polymeric gel, itself, can be roughly 5 microns in thickness in its unswelled state.

Various swelling solutions can be employed in the present invention. A typical swelling solution is a combination of water and a water-miscible solvent. The solvent can be chosen, for example, from the group consisting of methanol, ethanol, propanols, butanols, pentanols and acetone. One particularly preferred solvent is 2-propanol. Various additives can also be included in the swelling solutions, such as stabilizers, sensitizing or desensitizing agents, softening agents, wetting agents, catalysts and the like.

The invention will next be described with certain illustrated embodiments and experimental results; however, it should be clear that various additions, subtractions and modifications can be made without departing from the spirit or scope of the invention. For example, the red, blue and green primary color system described herein can be replaced by other additive primary color schemes. The invention can be practiced in one-step, two-step and three-step holography methods. Moreover, the color control systems can be adapted to prepare holographic stereograms, such as those described by one of the present inventors in U.S. Pat. No. 4,834,476 herein incorporated by reference and can be used to construct color stereograms for viewing in either flat display or curved display systems. Additionally, the enzymatic pretreatment disclosed herein can be used in conjunction with emulsion softening agents and other additives.

DETAILED DESCRIPTION

Figure 1:
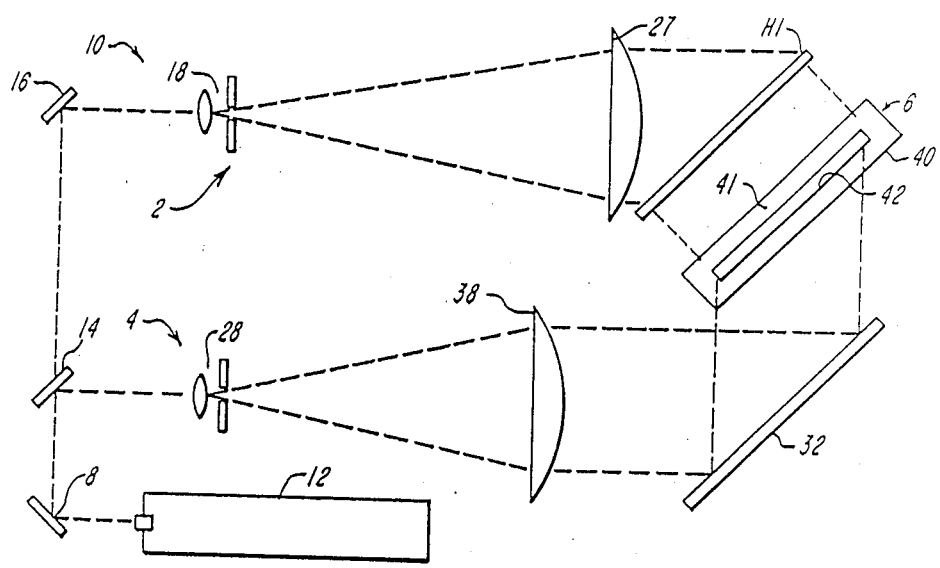
FIG. 1 is a schematic diagram of a pseudocolor holographic printer suitable for two step holographic printing according to the invention.

In FIG. 1, a holographic printer 10 for the preparation of two-step, reflection-mode, pseudocolor holograms is shown. In the two-step system, a first set of color-separated, holographic images are used to print the pseudocolor holograms. Printer 10 of FIG. 1 includes a laser 12, mirror 8, a beam splitter 14, object optics 2, reference optics 4, and an emulsion control system 6. The object optics 2 further include a spatial filter 18 (e.g., a divergent lens-pin hole filter), collimating lens 27 and a transmission hologram system H1 for projecting color-separated holographic images onto the emulsion 42. The reference optics 4 include spatial filter 28, collimating lens 38 and mirror 32. The emulsion control system 6 includes housing 40, swelling solution reservoir 41, and emulsion 42.

Light from laser 12 is divided by beam splitter 14 to form the object and reference beams. The object beam is used to project a series of color-separated holographic images from the hologram system H1 onto the emulsion. At the same time, the reference beam is likewise projected onto the emulsion to overlap the object beam exposure from behind and produce the pseudocolor reflection hologram.

Figure 2:
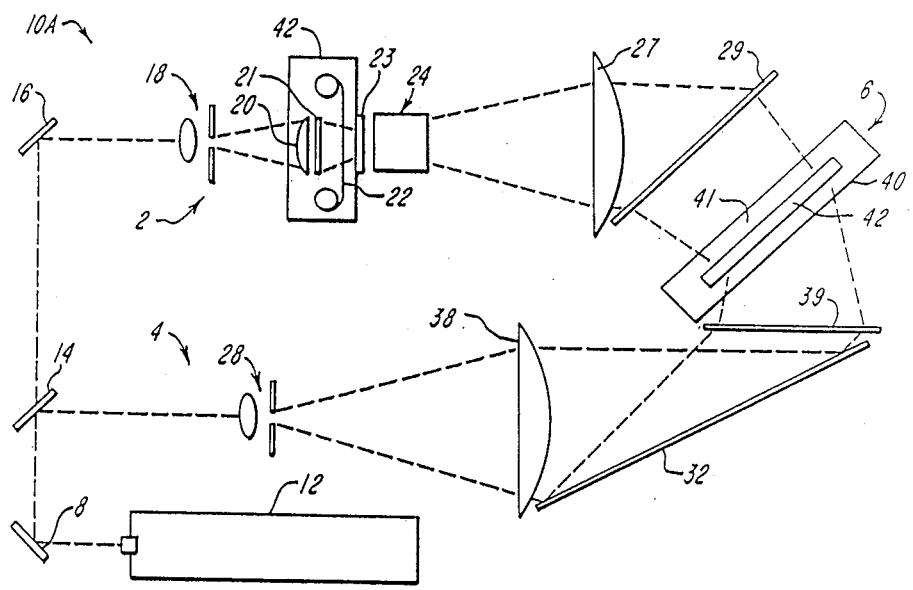
FIG. 2 is a schematic diagram of a pseudocolor holographic printer suitable for one step holographic printing according to the invention.

In FIG. 2, a holographic printer 10A adapted for preparation of one-step, reflection-mode pseudocolor holograms is shown. The components, which are the same or equivalent to those discussed above in FIG. 1, are referenced as like-numbered elements. The printer 10A includes a laser 12 (e.g., again, a krypton ion laser operating at about 647 nanometers), a first mirror 8, a beam splitter 14, object optics 2, reference optics 4, and an emulsion control system 6. The object optics 2 further include mirror 16, a spatial filter 18 (e.g., a divergent lens-pin hole filter), condensing lens 20, diffuser 21, projection medium 22, aperture 23, projection lenses 24, collimator 27, and cylindrical holographic optical element 29. The reference optics 4 include spatial filter 28, collimating lens 38, mirror 32, and holographic optical element 39. The emulsion control system 6 includes a housing 40, swelling solution reservoir 41, and the emulsion 42.

Again, in FIG. 2 light from laser 12 is divided by beam splitter 14 to form the object and reference beams. The object beam is diverged and then converged by lenses 18 and 20 to illuminate the perspective views on projection medium 22. The medium 22 can be 35 millimeter film or any other light modulating medium, such as an electrooptic image modulator, which presents the three color separation images sequentially to the recording media. The color separation images can be actual photographic recordings or, particularly for computer-aided design applications, can be computer generated designs.

In either event, the images are projected by projection lenses 24, such that the collimator 26 and the cylindrical holographic element 29 can image the three color separation views onto the recording medium 42. At the same time, the reference beam is filtered by spatial filter 28 and likewise projected by collimating lens 38 and mirror 32 to overlap the object beam exposure from behind on the holographic medium 42.

Figure 3:
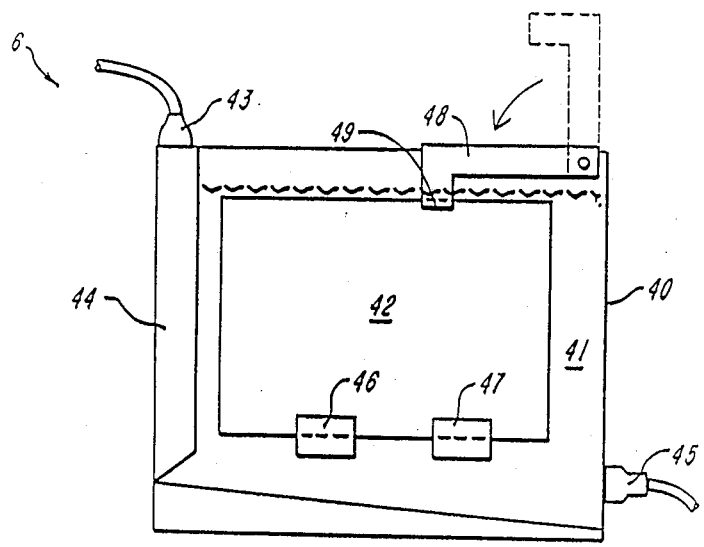
FIG. 3 is a more detailed schematic diagram of an emulsion color control system according to the invention.

In FIG. 3, the emulsion control system 6 of FIGS. 1 and 2 is shown in more detail, including a housing 40, a solution reservoir 41, the emulsion 42, a solution inlet 43, filling channel 44, and a solution outlet 45. Plate 42 is held in place within the housing by lower V-shaped wedges 46 and 47, cooperating with a third V-shaped wedge 49 disposed upon a hinged arm 48.

In practice, the emulsion control system 6 serves to permit in-situ swelling of the emulsion, by bathing the emulsion in a swelling solution as the reservoir 41 is filled. Once the emulsion swells to its equilibrium thickness (as determined by the solution concentration) the emulsion is ready for exposure. The reservoir can also serve to provide enzymatic pretreatment to the emulsion or, alternatively, a separate pretreatment chamber can be employed. Additionally, although the system is shown with a plate-like emulsion disposed in the reservoir, it should be clear that film-backed emulsions can also be employed and that the system 6 can further include dispensing rolls, take-up rolls, and the like to process a film-backed emulsion.

The invention will be further described in connection with the following non-limiting experimental data.

EXAMPLES

Calibration experiments were undertaken to measure the changes in the thickness of a polymeric emulsion by noting the changes in the central wavelength reflected by a simple holographic reflection grating immersed in various solutions. The gratings were exposed on Agfa 8E75HD emulsions that had been index-matched to a front surface mirror and exposed with an expanded, collimated beam from a helium-neon laser incident perpendicular to the plate. The plates were then processed without hardening, fixed and rehalogenated in bromine water to simulate an unused emulsion. The wavelength of peak diffraction efficiency varied with the exposure, as it was dependent on the collapse of the emulsion following the removal of the undeveloped silver by the fixer. Most of the gratings had an initial peak diffraction efficiency wavelength between 500 and 550 nm.

The processed plates were held in a small glass-walled tank, and reflection spectra were measured in terms of International Light Model 700A spectroradiometer. The swelling of the emulsion was measured in terms of the upward shift of the peak wavelength of the reflection spectrum, which varied with the concentration of water in various organic solvent mixtures. The amount of shift, time to stabilization of the shift, and general character of the spectrum were noted for each sample solution.

Water was used as the swelling agent in all cases, with varying concentrations of water-miscible solvents used to reduce the "partial pressure" of water in the system. Each of these solvents produced characteristic changes in grating profile, time of equilibrium, and amounts of swelling from various percentages of dissolved water. These effects were produced by the transport of water through the emulsion, and the "competition" for that water by the gelatin at various depths in the emulsion. Isopropyl alcohol solutions were found to provide the shortest time of equilibrium in the range of swellings necessary for a good set of primary colors.

A holographic plate was placed into the swelling tank in the holographic setup, imaging a simple ground glass diffusion screen. The first in a series of solutions was poured into the tank, and allowed to settle for ten minutes. After exposure, the plate was removed, and another plate loaded in its place. The next solution was added to the tank, and again allowed to settle 10 minutes before exposure. This process was repeated for a range of swelling solutions.

In order to obtain final wavelengths of 620 nm, 520 nm and 470 nm by swelling the emulsions prior to exposure, it was necessary to pre-swell by 4%, 24%, and 38% respectively, assuming the development chemistry is properly chosen to replay the original recording wavelength when exposing an unswelled emulsion.

The calibration experiments had indicated that an 18% water solution would provide the 38% swelling needed for the "blue" exposure. However, this series of in-situ exposures showed that a higher percentage of water (25%) was necessary to obtain the desired 470 nm wavelength. There are several reasons for this discrepancy.

In order to compare the effects of various solvents, using different gratings on days with different relative humidity, the data was normalized to a consistent reference point, that being the wavelength of the grating when immersed in a 100% solvent solution, as this was independent of the day-to-day environment However, the gratings that were swelled in the various solutions during exposure dried down to thicknesses that depended on the relative humidity of the lab at the time. This thickness was approximately 5% larger than that of a grating in 100% solvent. Because the swelling solution produced an equilibrium thickness that was presumably constant regardless of the starting thickness of the emulsion, the effective percent swell of the pre-swelled exposure was less than that predicted by the gratings (as compared to their thickness in 100% solution) used in our calibration.

Another reason for the discrepancy seems to be that the gelatin is significantly altered by its immersion in water and by exposure to differing pH solutions during processing. When a gelatin dries from its "sol" state, hydrogen bonds are formed. Some of these bonds are easily broken when immersed in water or other softening agents, and do not re-form upon drying. These broken bonds seem to play in important role in subsequent swelling behavior.

An anomaly was observed in the swelling behavior for immersion in the 18% through 20% water solutions. For these solutions, only the outer layer of the emulsion seemed to swell, causing two gratings of different fringe separations to be present in the processed emulsion, and two peaks to appear in the spectra. The swelling anomaly was alleviated to an extent by treating the plates before exposure with a ten minute soak in water.

The series of in-situ exposures was repeated for Agfa-Gevaert 8E75HD emulsion batch numbers 590909, 590410, and 590209, having hardness values 630, 760, and 665 respectively (these values were measured by Agfa-Gevaert just after manufacture). All the emulsions reacted very similarly, despite their differences of hardness value.

Figure 4:
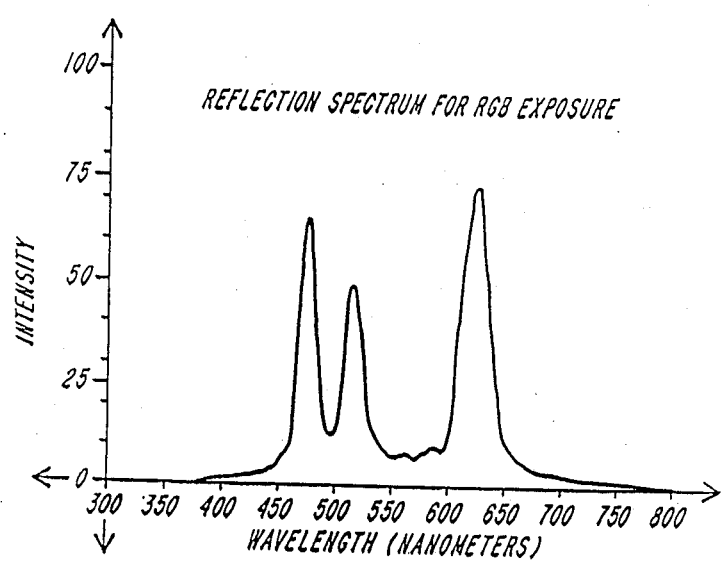
FIG. 4 is a graph of a reflection spectrum for pseudocolor holography according the invention showing intensity peaks corresponding to red, green and blue reconstruction wavelengths.

This method was then used to make multi-color exposures on a single plate. The desired wavelengths of approximately 620, 520, and 470 nm already had been obtained on separate plates that had been pre-treated with a ten minute pre-wet in water and dried, and immersed in 8%, 18%, and 25% solutions during exposure. These same solution concentrations were then used to sequentially swell a single, pre-treated plate for three successive exposures. The exposure times were adjusted to produce a neutral reflected hue. FIG. 4 shows the three-peaked reflection spectrum for this successful achromatic plate. A triple exposure to color separated three-dimensional, computer-generated images was then undertaken and a full-color holographic image was obtained on a single holographic plate.

Figure 5:
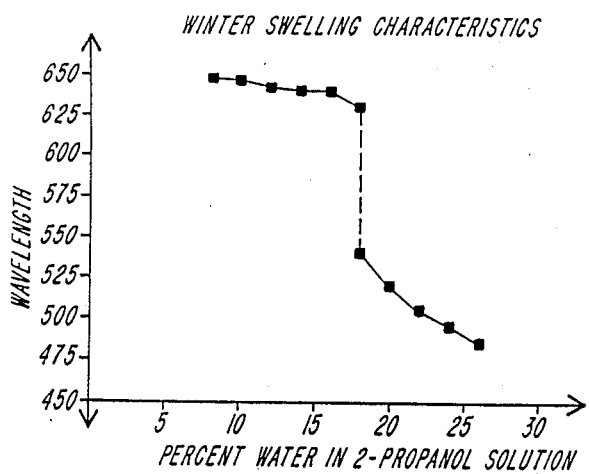
FIG. 5 is a graph of winter swelling characteristics for an illustrative emulsion, showing how the reconstruction wavelength varies with water content of the swelling solution.
Figure 6:
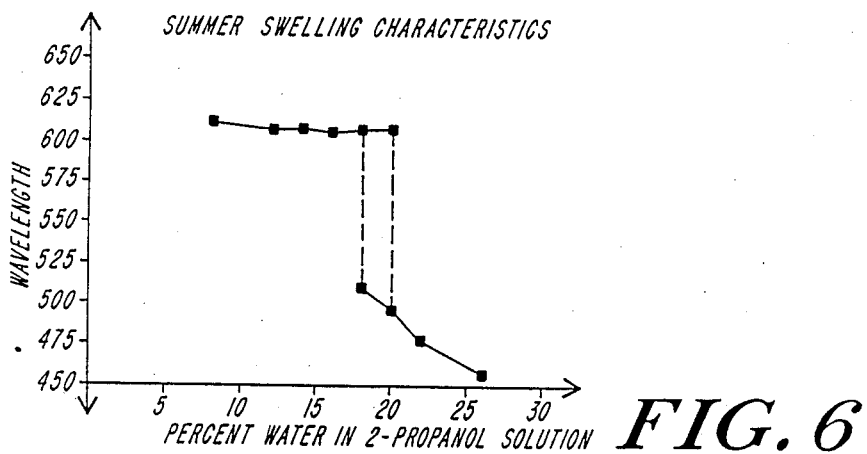
FIG. 6. is a similar graph of summer swelling characteristics (high relative humidity)

The tests described above were conducted during the winter, when the average relative humidity of the laboratory was 25%. The same exposures shot in the summer (average RH 50%) produced a shift of the entire spectral reflectance curve, and a slight change in the shape of the curve. The plates that were exposed in the winter showed an upward shift in wavelength (toward the red) compared to those that were exposed during the more humid months of the summer. In addition, the point of transition (the water concentration that produces the anomalous doubly-peaked spectrum) shifted to a higher water concentration during the summer months. This suggests that the "swellability" of the emulsion changes with the seasonal variations of the environment, and that the conditions of storage are critical for accurate wavelength reconstructions. FIGS. 5 and 6 show the comparison of the calibration series for winter and summer, respectively. The observed shift in swelling behavior during the summer months made it difficult to obtain a pure green primary image during this time. In order to obtain a satisfactory green primary, it becomes necessary to further soften the emulsion beyond what the simple water pre-wet was able to do.

The concentration of water necessary to produce the transition point (and hence the anomalous doubly-peaked spectrum) seems to be a characteristic of the emulsion and related to the crosslinks within the emulsion, itself. One method of reducing the crosslinks is the use of proteolytic enzymes to cleave various bonds in the emulsion structure, and hence change the character of the swelling response itself. Several enzymes have been investigated, including collagenase, maxatase, trypsin, and papain. Enzymes are generally large protein molecules, much like the structure of the gelatin itself. To obtain a uniform treatment throughout the thickness of the emulsion layer, we found that the enzyme solution should be weak, and the swelling period sufficiently long to permit uniform penetration. The trypsin enzyme was the most successful at obtaining an even swelling.

Figure 7:
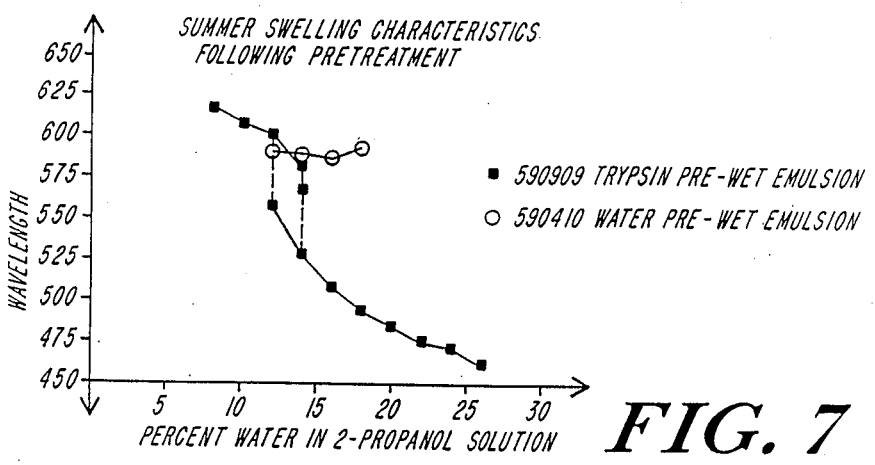
FIG. 7 is a graph of swelling characteristics, showing how pretreatment according to the present invention reduces swelling anomalies.

The trypsin results show an improvement over the simple water pre-wet, and the ability to once again obtain the desired pure green primary spectrum during the summer months. A plate was immersed in the trypsin solution for 3 hours. This plate was cut into pieces, and each piece exposed in a different concentration pre-swell solution. FIG. 7 shows a comparison between the enzymatic pre-wet emulsion with a transition zone from 12 to 14 percent, and a water pre-wet emulsion with a transition zone greater than 18 percent.

The choice of solvent in the solutions seems to have a strong effect on the progress of water through the emulsion depth, due partly to variations of the nature of the swelling that the solvent's polarity causes, and due to the literal "tug-of-war" for water that is evident within the emulsion for up to an hour after immersion with several of the solvents. 2-propanol is notable for the rapid and stable swelling that it produces.

The most noticeable, and experimentally troublesome feature of the emulsion swelling curve for 2-propanol and water solutions is the sudden jump of the swelling in the vicinity of the 18% solution needed to produce good "green" images. This jump reflects a well known property of gels in general: that at certain concentrations of solutes, they can expand suddenly and catastrophically. Exposures made in the solutions of this critical swelling range often appear to have two peak wavelengths, the shorter wavelength being more apparent while viewing from the emulsion side, and the longer wavelength (very close to the wavelength of the unswelled emulsion) more apparent from the glass side.

Most of the fairly weak van der Waals forces between the "unswelled" collagen molecules have the same strength, and they all break simultaneously when the water concentration reaches a certain point, producing a sudden transition in the swelling curve. As the water concentration increases, more of the stronger bonds become broken, and the emulsion swells even further.

The swelling of gelatin occurs when polar water molecules intrude upon the rather subtle hydrogen bonds between adjacent collagen strands. But it seems that the intruding water molecules themselves become partially bonded in the process, so that the water becomes much harder to remove. Thus the amount of water in the emulsion becomes a function of the history of the swelling, exhibiting a "hysteresis" in the swelling curve.

The data presented was obtained by increasing the concentration of water in each subsequent swelling solution. If the same experiments are attempted by decreasing the concentration of water from 25% to 8%, the swellings obtained are uniformly higher. This is partially due to the "locking up" of water within the gelatin, and partially because the gelatin will dry first at its surface, so that transport of water through that "dried" skin becomes very slow. The sequence of increasing water concentrations was chosen in order to hasten the process.

The difficulty of extracting water from the emulsion favors a procedure in which the minimally swelled "red" exposure is made first, followed by the moderately swelled "green" exposure and the maximally swelled "blue" exposure. The breakdown of exposure reciprocity, a slight but persistent extraction of sensitizing dye in the swelling solutions, and possible hypersensitization effects of the emulsion pre-treatment make the diffraction efficiencies of otherwise equal exposures strongly dependent on their order. In one illustrated protocol, the first and second exposures were given 28% of the total exposure time each, and the last exposure 44% in order to approximately balance the color component images (this is generally fine-tuned on a case-by-case basis). Of course, the effect of multiple incoherent exposures also decreases the overall diffraction efficiency by 1/N, where N is the number of exposures, but the exposure and processing is such that a high overall diffraction efficiency is maintained. In any event, one key to reliable and consistent color control especially for the moderately swollen "green" exposure, lies in the enzymatic pre-treatment of the emulsion to manipulate the range of gelatin bonding strengths.

What we claim is:

1. A method of recording a pseudocolor hologram, the method comprising:
    pretreating a holographic recording medium formed from a polymeric emulsion with an enzymatic agent to reduce crosslinkage of the polymeric emulsion, and thereby reduce swelling anomalies upon exposure to a swelling solution; and
    exposing the recording medium to a plurality of color separation images while the volume of the emulsion is varied by swelling to form a set of registered holographic images having different reconstruction wavelengths.

2. The method of claim 1 wherein the step of pretreating the medium further comprises contacting the emulsion with a proteolytic enzyme.

3. The method of claim 1 wherein the step of pretreating the medium further comprises contacting the emulsion with an enzyme chosen from the group consisting of trypsin, collagenase, maxatase, papain, and mixtures thereof.

4. The method of claim 1 wherein the step of pretreating the medium further comprises contacting the emulsion with trypsin.

5. The method of claim 1 wherein the step of pretreating the medium further comprises contacting the emulsion with a solution ranging from about 0.001 percent to about 0.00005 percent by weight of the enzymatic agent.

6. A method of holographic color control, the method comprising:
    treating a holographic emulsion with an enzymatic agent to induce the cleavage of bonds in the emulsion, and thereby reduce swelling anomalies;
    contacting said holographic emulsion with a first swelling solution to produce an increase in thickness of said emulsion;
    exposing said emulsion following contact with said first solution to a first color-separated image to create a recording capable of producing a first reconstruction color image;
    contacting said holographic emulsion with a second swelling solution to produce a variation in the thickness of said emulsion;
    exposing said emulsion following contact with said second solution to a second color separated image to create a recording capable of producing a second reconstruction color image;
    contacting said holographic emulsion with a third swelling solution to produce a further variation in the thickness of said emulsion; and
    exposing said emulsion following contact with said third solution to a third color separated image to create a recording capable of producing a third reconstruction color image.

7. The method of claim 6 wherein the step of exposing said emulsion to said first, second and third color-separated images further comprises exposing the emulsion to said color-separated images in-situ while the emulsion remains bathed by said first, second and third solutions, respectively.

8. The method of claim 6 wherein the step of treating the emulsion with an enzymatic agent further comprises treating said emulsion with trypsin.

9. The method of claim 6 wherein said swelling solutions are a combination of water and a water miscible solvent.

10. The method of claim 9 wherein said solvent is a solvent chosen from the group consisting of methanol, ethanol, propanols, butanols, pentanols, acetone, and mixtures thereof.

11. The method of claim 9 wherein said water miscible solvent is 2-propanol.

12. In a method of recording pseudocolor holograms by exposing a polymeric emulsion to a plurality of color separation images while the volume of the emulsion is varied by swelling to form a set of superimposed holographic images having different reconstruction wavelengths, the improvement comprising:
    pretreating the polymeric emulsion with an enzymatic agent to reduce swelling anomalies.

13. The method of claim 12 wherein the step of pretreating the polymeric emulsion further comprises treating the emulsion with a proteolytic agent.

14. The method of claim 12 wherein the step of pretreating the polymeric emulsion further comprises treating the emulsion with trypsin.

15. A holographic printer for recording pseudocolor holograms comprising:
    a holographic recording medium formed from a polymeric emulsion;
    a laser source of coherent light;
    a beamsplitter for splitting said laser light into an object beam and a reference beam;
    object beam projection means for projecting a plurality of color-separated images of an object onto said recording medium;

reference beam projection means for projecting a reference beam onto said medium coincident with the projection of each color-separated image so as to create overlapping exposures with said object images;

treatment means for treating said emulsion with an enzymatic agent to reduce swelling anomalies; and swelling means for varying the volume of the emulsion between exposures with said color-separated object images to form a set of superimposed holographic images having different reconstruction wavelengths.

16. The printer of claim 15 wherein the swelling means further comprises a transparent housing for holding said emulsion, and a swelling solution reservoir for bathing the emulsion in a swelling solution to induce variations in the emulsion thickness.

17. The printer of claim 16 wherein the housing further comprises a filling inlet and a drainage outlet to permit contact of the emulsion with different swelling solutions.

* * * * *